United States Patent [19]
Gardner

[11] 3,836,027
[45] Sept. 17, 1974

[54] TRUCK WHEEL DOLLY
[76] Inventor: Clive D. Gardner, 1188 Lorrain Dr., Salt Lake City, Utah 84106
[22] Filed: Apr. 2, 1973
[21] Appl. No.: 346,916

[52] U.S. Cl................ 214/331, 254/10 R, 254/133
[51] Int. Cl............................................ B60b 29/00
[58] Field of Search .......... 214/390, 330, 331, 332, 214/333, 334; 254/10 R, 133

[56] References Cited
UNITED STATES PATENTS

| 217,669 | 7/1879 | Adams............................. 254/10 R |
| 2,360,771 | 10/1944 | Haberstump..................... 254/10 R |
| 2,410,902 | 11/1946 | Roberts............................. 214/332 |
| 2,725,998 | 12/1955 | Huff.................................. 214/332 |

*Primary Examiner*—Robert J. Spar
*Assistant Examiner*—Lawrence J. Oresky

[57] ABSTRACT

A truck wheel dolly easily implaced and adjustable for use in lifting, transporting and remounting heavy truck wheels and tires, and this with a mimimum of effort or difficulty as such wheels are lifted, removed and replaced relative to the wheel axle. The dolly includes its own self-contained hydraulic jack with lever and like coupling means for lifting an elevatable frame supported by links to a base frame. The elevatable frame includes hinged support bars or means supplying versatility in use of the equipment. Wheel support bar means as well as auxiliary spacer bars are provided. Wheels and casters are supplied so as to provide fine adjustment in placement of the dolly preparatory to use. Support rail means is provided the lift frame so that a wheel may rest thereagainst and be supported thereby so that oil seals and the like at journaling areas will not be deleteriously disturbed.

5 Claims, 4 Drawing Figures

PATENTED SEP 17 1974 3,836,027
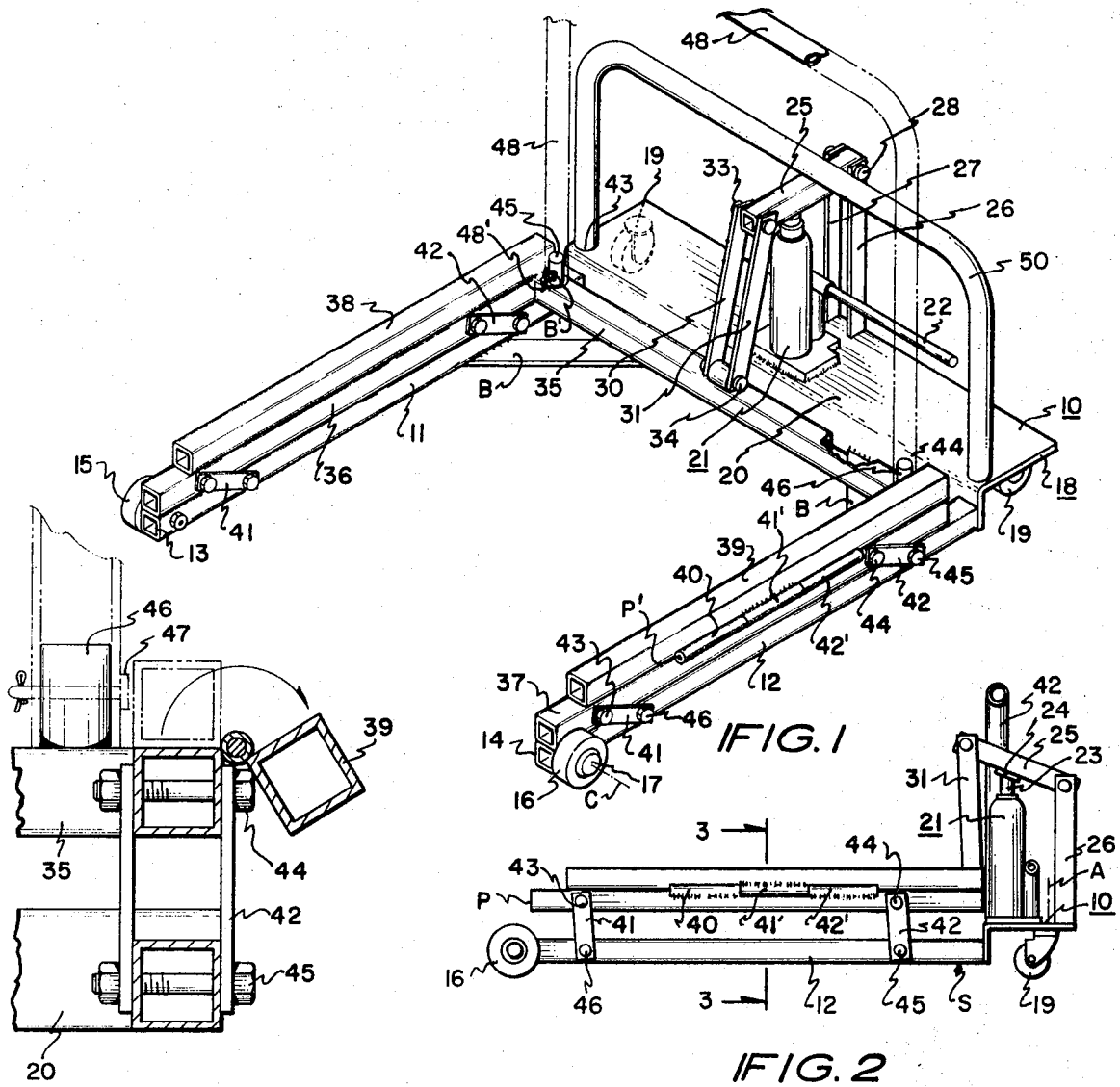
FIG. 1
FIG. 3
FIG. 2
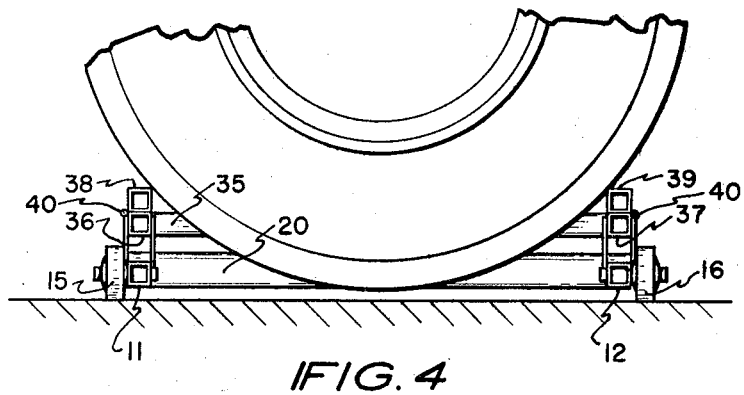
FIG. 4

TRUCK WHEEL DOLLY

The present invention relates to truck dollys and, more common particularly, to a new and improved truck wheel dolly which includes hydraulic jack means and a lift frame, usable in lifting, translating, balancing, and returning heavy truck wheels to their respective axles with a mimimum of difficulty and effort.

In the past it has been difficult to properly and easily support and lift truck tires preparatory to their removal from truck axles. Among the difficulties encountered are that conventional dollys are very difficult to manuver to proper placement position. Secondly, raiseable frames in the past tend to cantilever outwardly to unsupported condition, and this chances deformation of the support structure through long periods of use. Additionally, prior devices have not been adaptable to accommodate various-sized tires.

Accordingly, a principal object of the present invention is to provide a new and useful support dolly for heavy truck tires.

A further object of the invention is to provide a tire dolly for trucks wherein the lifting frame thereof is supported by linkage means to a base frame carrying a hydraulic lift mechanism.

An additional object is to provide a dolly having both wheels and casters, and these arranged in particular location in such that fine adjustment and easy placement of the dolly relative to the wheel to be lifted may be achieved.

An additional object is to provide auxilary support bars hingedly mounting to the lifting frame, which bars can be disposed either upwardly in position or laterally out of the way, so that the frame can accommodate a variety of tire sizes.

An additional object is to provide a truck dolly having elevating structure arranged such that the elevating frame thereof, upon lateral lifting, is not only raised but drawn outwardly, this so as not only to tend to lift the tire but also to draw the same outwardly slightly from its axle.

An additional object is to provide a truck wheel dolly wherein the wheel can be provided with a support frame of vertical nature, this to preclude damage to or malfunctioning of oil seal journals of the truck wheel relative to its axle.

In accordance with the present invention, a liftable support frame is linked by parallel links to a base frame, and is raised thereup through linkage and lever means, by means of a hydraulic jack supported by a platform tied to the base frame. Handle means is provided for manipulating this structure, and an auxiliary vertical support bar, of inverted-U configurment, is provided to support the wheel at and after wheel removal from its respective axle.

Linkage of the upper support frame directly supporting the wheel provides additional support, in combination with the lever and linkage provided the lifting mechanism, so that warpage of the support bars is prevented. Auxiliary bars are hinged to the upper support bars of the lift frame so as to accommodate wheels of different sizes.

Support wheels and castors are provided to insure a mimimum of difficulty in fine adjustment of the dolly relative to a truck wheel to be lifted and supported by the dolly.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a fragmentary perspective view of a truck wheel dolly constructed in accordance with a preferred embodiment of the present invention.

FIG. 2 is a side elevation of the structure shown in FIG. 1 with the wheel support frame now being in lift position relative to that position illustrated in FIG. 1.

FIG. 3 is an enlarged detail and a transverse section of representative arm structure shown in FIG. 2.

FIG. 4 is and end view of the structure of FIG. 1 when the same is used to support a tire-included wheel, the wheel being given additional height by the prior upward positioning of the auxiliary support bars.

In FIG. 1 platform 10 comprises an elongate angle iron or bracket to which are welded lower bars 11 and 12. The rearward extremities 13 and 14 of these bars journal wheels 15 and 16 as by shafts or pins 17.

To the underside 18 of platform 10 are journaled a pair of mutually spaced casters 19, journaled about respective pivot axes A. Welded to the upper surface 20 of platform 10 is a hydraulic jack 21 having actuating handle 22. An extensable, load-bearing shaft or pistion 23 seats in a ring 24, the latter being welded to the underside of lever 25. Posts 26 and 27 are provided with pivot means 28 comprising bolt and nut attachments which pivot the lever 25 in the manner shown in FIGS. 1 and 2.

Links 30 and 31 are pivotally secured at their opposite ends, by pivot attachment means 33 and 34, to lever 25 and also to crossbar 35. Crossbar 35 is welded at its opposite ends to upper rails 36 and 37, the crossbar and upper rails forming a general U-configurment.

Auxiliary rails 38 and 39 are hinged, as by hinge means 40, 41', and 42', to the upper bars 36 and 37. Thus, hinge pins P' are provided in each of the hinge structures comprising hinge segments 40 and 42', welded to the upper bar, and medial hinge segment 41' welded to the auxiliary bar such as bar 39 in FIG. 3. FIG. 3 illustrates in phantom line the position and in solid lines when the bar is pivoted outwardly. Thus, it is seen that various sizes of tires may be accommodated where the support comprising crossbar 35 and the mutually parellel bars sustend an equivalent chord length of tire.

Links 41 and 42 are pivoted by pin attachment means 43–46 to opposite ones of the upper bars 36 and 37.

In operation, the raising of jack 21, and particularly at its piston 23, causes the ascent of right-sloping lever 25, particularly at its left end in FIG. 2, so as to tend to bring the links 30 and 31 upwardly and near the jack. This in turn produces a raising as well as a pivotal movement forwardly of the horizontal platform P comprising bars 36 and 37 and crossbar 35. Accordingly, by such means a wheel is both raised and drawn outwardly slightly from its axle toward the jack 21. If a smaller wheel is to be accommodated, then, preliminarily to the actuation of the jack so as to raise lever 25, the auxiliary bars 39 will be disposed upwardly as seen in FIG. 4.

U-shaped handle bar 50 and bar 48 are inverted as shown, with the ends of the latter being hollow at 43 and 44 and being constructed to slip over up-raised mounting bosses or pins 45 and 46. Suitable apertures B' may be provided for the reception of pins and cotter keys 48'. The bar 48 is useful so as to provide a vertical support for the wheel being withdrawn from its axle. Likewise, the same preserves the integrity of any seal structure that may be utilized in connection with the journaling of the wheel to the axle. Additionally, the inclusion of bar 42 leaves handle 50 accessible as a manual aid, for placement.

Casters 19 pivot on respective vertical axles so that the structure may be easily positioned relative to a tire. Small incremental adjustment and accuracy of placement is facilitated through use of wheels 17 which are simply pivoted to fixed horizontal axles having respective axes C.

Accordingly, in operation, the upper extension of the jack 21 tends to raise lever 25 so as to draw upwardly on links 30 from essentially angulated position in FIG. 1 to an essentially vertical position as shown in FIG. 2. Again, this not only raises the frame P but urges the same forwardly toward the jack, thereby tending to draw the wheel from its axle if this is intended. The hinge means at 42', 40, and 41' enable the selective placement of the auxiliary rails 38 and 39 upwardly as seen in FIG. 4 for smaller sized wheels, and for permitting the same to be rotationally displaced outwardly as seen in FIG. 3 so that the lower frame may accommodate the larger wheels.

Braces B may be welded to the frame structure illustrated in FIG. 1 to add further support to the composite lower frame structure S comprising lower bars 11 and 12 with platform 10.

While particular embodiments of the present invention have been shown and described, it will be obvious to those skilled in the art that changes and modifications may be made without departing from this invention at its broader aspects and, therefore, the aim in the appended claims is to cover all such modifications as fall within the true spirit and scope of the present invention.

I claim:

1. A truck wheel dolly including, in combination, a lower horizontal, U-shaped frame comprising a pair of mutually spaced lower rails connected together at one end by a platform; vertical jack means upstanding from said platform; an upper, horizontal, U-shaped frame, including upper rails disposed over said lower rails of said lower U-shaped frame, and indented relative to said platform, said upper frame including a crossbar proximate said jack means and auxiliary elongate spacer rails vertically aligned with, supported in their support position, and longitudinally pivoted to their respective upper rails, and being thereby pivotal outwardly from their respective support position to a non-support position; first link means intercoupling said upper and lower frames; a lever pivotably supported above and operatively engaging said jack means; vertical post means affixed to and upstanding from said platform on a side of said jack means remote from said upper frame, said lever being pivotably secured to said post means proximate one extremity of the former; and second link means, vertically aligned with said jack means and said post means, articulatively secured to and between said upper frame, medially of said crossbar, and the remaining extremity of said lever.

2. A truck wheel dolly including, in combination, a lower horizontal, U-shaped frame comprising a pair of mutually spaced lower rails connected together at one end by a platform; an upper, horizontal, U-shaped frame, including upper rails disposed over said lower rails of said lower U-shaped frame, and indented relative to said platform; first link means intercoupling said upper and lower frames; jack means upstanding from said platform; a lever pivotably supported above and operatively engaging said jack means; post means affixed to and upstanding from said platform on a side of said jack means remote from said upper frame, said lever being pivotably secured to said post means proximate one extremity of the former; and second link means, articulatively secured to and between said upper frame and the remaining extremity of said lever, and wherein said upper frame includes a crossbar joined to said upper rails at corresponding extremities thereof, and auxiliary, elongate, spacer rails pivoted to said upper rails along a longitudinal axis to provide that these rails in one position vertically above said upper rails act as a spacer to increase the height of the support surface on which a wheel rests.

3. The structure of claim 1 wherein said crossbar is joined to said upper rails at corresponding extremities thereof proximate said platform, said second link means being vertical and pivotally secured to said crossbar, centrally thereof, within said support rail means and being inclined toward said jack means, and inverted U-shaped support rail means secured to and upstanding from said crossbar.

4. The structure of claim 3 wherein said crossbar has upstanding mounting bosses, said support rail means being secured to said bosses.

5. The structure of claim 1 wherein said first link means comprise plural links disposed on opposite sides of and pivotally connected to said upper and lower frames at said rails thereof.

* * * * *